(12) United States Patent
Nugent, Jr. et al.

(10) Patent No.: US 11,581,953 B2
(45) Date of Patent: Feb. 14, 2023

(54) DUAL-USE POWER BEAMING SYSTEM

(71) Applicant: LASERMOTIVE, INC, Kent, WA (US)

(72) Inventors: Thomas J. Nugent, Jr., Bellevue, WA (US); Richard Gustafson, Tacoma, WA (US)

(73) Assignee: LaserMotive, Inc., Kent, WA (US)

( * ) Notice: Subject to any disclaimer, the term of this patent is extended or adjusted under 35 U.S.C. 154(b) by 284 days.

(21) Appl. No.: 17/087,198

(22) Filed: Nov. 2, 2020

(65) Prior Publication Data
US 2023/0016800 A1 Jan. 19, 2023

Related U.S. Application Data

(60) Provisional application No. 62/929,928, filed on Nov. 3, 2019.

(51) Int. Cl.
| | |
|---|---|
| *H04B 10/00* | (2013.01) |
| *H04B 10/80* | (2013.01) |
| *G01S 17/66* | (2006.01) |
| *H04J 14/00* | (2006.01) |

(52) U.S. Cl.
CPC ............ *H04B 10/807* (2013.01); *G01S 17/66* (2013.01)

(58) Field of Classification Search
CPC ............... F41H 13/0043; F41H 13/005; F41H 13/0062; H04B 10/806; H04B 10/807
See application file for complete search history.

(56) References Cited

U.S. PATENT DOCUMENTS

| | | | | |
|---|---|---|---|---|
| 2010/0079008 A1* | 4/2010 | Hyde | ...................... | H02J 50/80 250/201.1 |
| 2021/0270568 A1* | 9/2021 | Iwashimizu | .......... | G01S 13/865 |

\* cited by examiner

*Primary Examiner* — Daniel G Dobson
(74) *Attorney, Agent, or Firm* — Elizabeth E. Nugent

(57) ABSTRACT

A dual-use electromagnetic beam system may be used as a remote power delivery system when not needed as an offensive weapon. For example, a system for disabling or destroying uncooperative or enemy assets such as UAVs or ground vehicles may be used during "down time" to provide power to assets that are separated from prime power sources by distance or by logistics.

20 Claims, 5 Drawing Sheets

DUAL-USE POWER BEAMING SYSTEM

CROSS-REFERENCE TO RELATED APPLICATIONS

This application claims benefit under 35 U.S.C. § 119(e) to provisional application No. 62/929,928, filed Nov. 3, 2019, which is incorporated by reference herein to the extent not inconsistent herewith.

BACKGROUND

Power beaming is an emerging method of transmitting power to places where it is difficult or inconvenient to access using wires, by transmitting a beam of electromagnetic energy to a specially designed receiver which converts it to electricity. Power beaming systems may be free-space (where a beam is sent through atmosphere, vacuum, liquid, or other non-optically-designed media), or power-over-fiber ("PoF"), where the power is transmitted through an optical fiber. The latter may share certain disadvantages with wires in some circumstances, but may also offer increased transmission efficiency, electrical isolation, and/or safety. Free-space power beaming may be more flexible, but may also offer more challenges for accurate targeting of receivers and avoiding hazards such as reflections and objects intruding on the power beam.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventors' approach to the particular problem, which in and of itself may also be inventive.

SUMMARY

In one aspect, a system for directing power includes a light source (e.g., a laser or a microwave or millimeter wave source) configured to emit a beam of electromagnetic energy, shaping optics configured to shape the beam into a selected beam profile, a beam director configured to direct the beam in a selected direction, and a switch configured to switch the system between a power mode and a weapon mode. In the power mode, the beam director is configured to direct the beam toward a receiver and the shaping optics are configured to shape the beam profile into a power profile selected to match a size and shape of the receiver. In the weapon mode, the beam director is configured to direct the beam toward a target and the shaping optics are configured to shape the beam profile into a weapon profile selected to inflict damage on the target. The system may further include a receiver configured to receive the directed beam and convert it into power. The weapon mode may include a more concentrated irradiance than the power mode. The switch may be configured to change the beam of electromagnetic energy emitted from the light source, for example to deliver more electromagnetic power, to a different wavelength, or in cases where the light source includes a plurality of light sources, to a different subset of the plurality.

In another aspect, a method of beaming power to a receiver and damaging an uncooperative target includes transmitting a beam of light toward the receiver for conversion to electrical energy; in response to detection of an uncooperative target (for example, by visual or by automated detection), changing at least one characteristic of the beam of light; directing the changed beam of light toward the uncooperative target, and damaging the uncooperative target with the changed beam of light. The method may further include receiving the beam of light at the receiver and converting the beam of light into electricity at the receiver, for example using a photovoltaic cell, a rectenna, or a heat engine. Directing the changed beam of light toward the uncooperative target may include switching off the beam of light while redirecting a beam director toward the uncooperative target. The method may further include resuming directing light to the receiver in response to a determination that the target has been damaged, or in response to a determination that the receiver is in need of power.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF FIGURES

The drawing figures depicts one or more implementations in according with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detail, in order to avoid unnecessarily obscuring aspects of the present teachings. Those of ordinary skill in the art will nevertheless understand the features of these methods, procedures, components, and/or circuitry and how they may be used in the descriptions below.

As discussed above, power beaming is becoming a viable method of powering objects in situations where it is inconvenient or difficult to run wires. For example, free-space power beaming may be used to deliver electric power via a ground-based power receiver to power a remote sensor, to recharge a battery, or to power an unmanned aerial vehicle (UAV) such as a drone copter, allowing the latter to stay in flight for extended periods of time. Once a high-power laser or other energy source is installed for providing such power, it may be desirable in some situations to use that source (and/or its associated optics) as a weapon against undesirable aircraft, mortars, or other projectiles. Or when high-intensity laser weapons or the like are available for disabling enemy vehicles or projectiles, they may advantageously be used during "down time" for power beaming. UAVs have become a ubiquitous feature of modern warfare, for example used for surveillance of uncooperative forces. It would be desirable for the same system that beams power to friendly UAVs or ground stations to also be used offensively against uncooperative UAVs. The system described herein combines features optimized for power beaming and also for beam weapons to provide a flexible and robust device.

Figure 1:
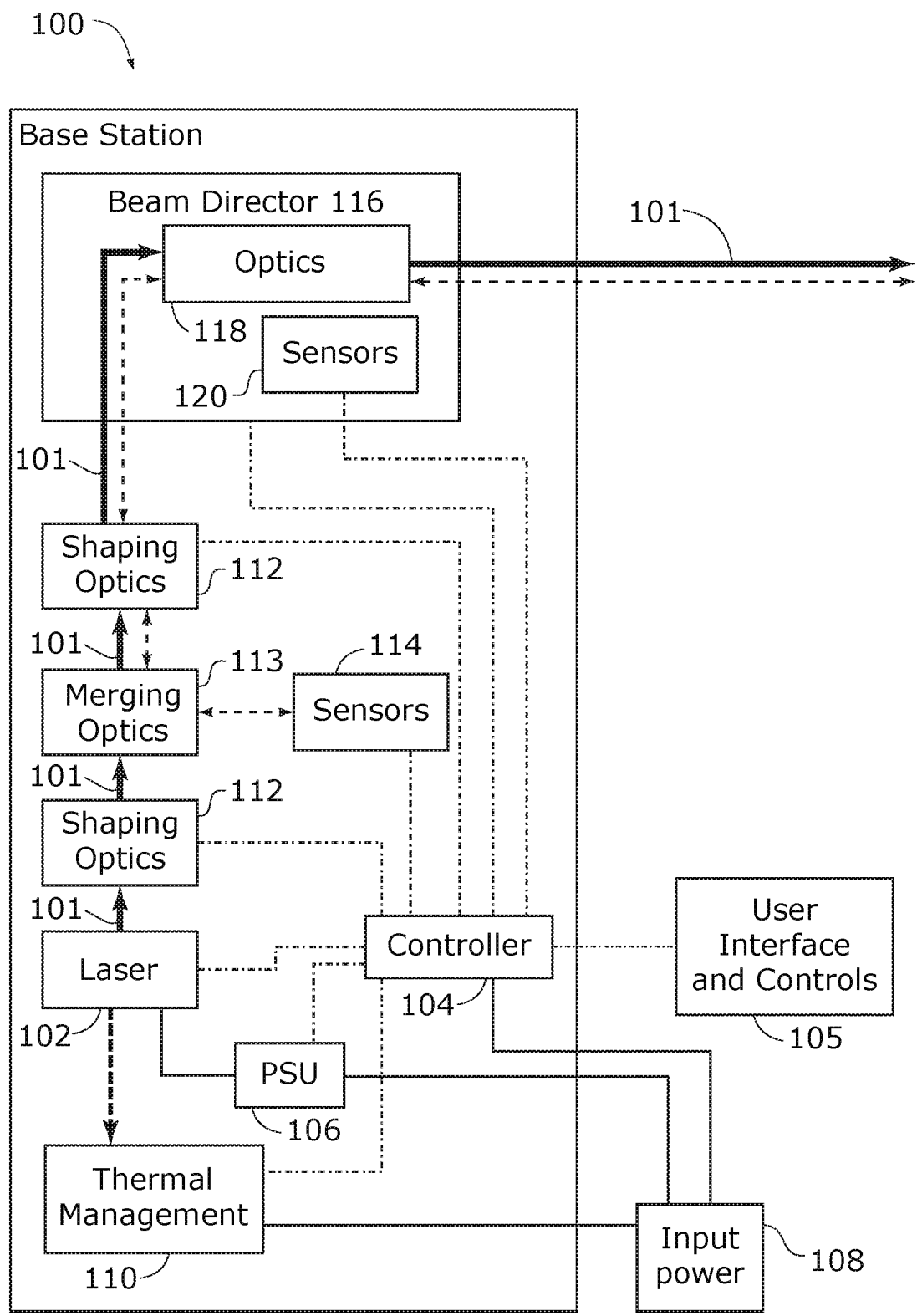
FIG. 1 is a schematic diagram of a power beaming base station.

Referring to FIG. 1, a power beaming base station 100 includes a light source 102, which may be, for example, a diode laser, fiber laser, magnetron, or klystron. It will be understood that the term "light source" is intended to encompass all forms of electromagnetic radiation that may be used to transmit energy, and not only visible light. For example, light source 102 may emit ultraviolet, visible light, infrared, millimeter wave, microwave, radio waves, and/or other electromagnetic waves, any of which may be referred to herein generally as "light." The term "power beam" is used interchangeably with "light beam" to mean a high-irradiance transmission, generally directional in nature, which may be coherent or incoherent, of a single wavelength or multiple wavelengths, and pulsed or continuous. Light source 102 is connected to controller 104, power supply unit (PSU) 106 (which is in turn connected to input power 108), and a thermal management system 110 (in FIG. 1 and FIG. 2, heat flow is denoted by heavy dashed lines, while light is a heavy solid line). Controller 104 controls operation of light source 102 and may be manual (for example using user interface 105), partially automated, or fully automated, depending on design constraints of the system. In particular, controller 104 may receive input from a safety system, described in more detail below, which is designed to turn off the beam, for example when an uninterrupted path from base station 100 to a receiver cannot be assured or when other hazardous conditions may be associated with continuing to beam power. PSU 106 draws power from input power 108, which may be, for example, a power grid, a generator, or a battery, and supplies it to light source 102. Thermal management system 110 monitors the temperature of light source 102 and makes sure it does not exceed safe values.

As shown in FIG. 1, light 101 emerges from light source 102 and enters shaping optics 112 and optional merging optics 113. It will be understood that while light 101 maintains the same reference numeral throughout FIG. 1, the characteristics of light 101 may change in various ways as it passes through different optics and other components. Shaping optics 112 may include lenses, mirrors, phased arrays, or any other appropriate component for managing direction, divergence, and beam irradiance profile of the light. Merging optics 113 are generally used for combining multiple optical paths, or possibly for separating them when optical flow is in the opposite direction. For example, an outgoing laser beam for transmitting power may be combined with an incoming optical beacon used for tracking a receiver. Shaping optics 112 and merging optics 113 will generally be chosen to match the wavelength domain of light source 102, and can be used to change the size, shape, or intensity distribution of the power beam. For example, when beaming power to a receiver, it may be desirable in some implementations to match the beam width to the size of the receiver, and possibly to "flatten" the beam irradiance profile to be relatively uniform across a surface of the receiver.

Beam direction and beam profile shaping is discussed in more detail in co-pending and commonly owned patent application no. PCT/US20/34095, entitled "BEAM PROFILE MONITOR," which is incorporated by reference herein to the extent not inconsistent herewith. In particular, the mechanisms described therein for monitoring the placement of a power beam on a receiver and using the monitored data to feed back to controller 104 and/or to beam director 116 may be incorporated into the present system. Optics 112 may interact with sensors 114, which can be used to provide feedback information for tracking the receiver (or, as described below in connection with FIG. 4, an uncooperative target) and pointing the beam at it, to measure the beam characteristics such as direction or irradiance profile, or to monitor for obstructions in the light path. More details on detecting obstructions and maintaining beam safety may be found, for example, in patent application Ser. No. 15/574,655 ("MULTI-LAYERED SAFETY SYSTEM"), Ser. No. 15/574,657 ("LIGHT CURTAIN SAFETY SYSTEM"), Ser. No. 15/574,659 ("DIFFUSION SAFETY SYSTEM"), Ser. No. 16/079,073 ("REMOTE POWER SAFETY SYSTEM"), 62/851,033 ("REMOTE POWER BEAM-STARTUP"), and PCT/US20/34104 ("SAFE POWER BEAM STARTUP"), each of which is incorporated by reference herein to the extent not inconsistent herewith. Sensors 114 may be used to adjust the optics, and/or data from sensors 114 may be fed back into controller 104 to adjust light source 102, for example for safety considerations. FIG. 1 (and FIG. 2 below) show paths of sensing signals as dashed lines, and data and/or control signals as dot-dashed lines. For example, an incoming optical beacon may follow the same path as the outgoing light beam 101, as shown by the parallel dashed line. Control and data signals may pass between controller 104 and other components, as shown by dot-dashed lines.

After passing through optics 112, the light 101 is directed by beam director 116 in a desired direction away from the base station 100. In some implementations, beam director 116 may itself include mirrors or other components for directing the beam (not shown), motors for adjusting mirrors or other components (not shown), more shaping optics 118, and/or sensors 120, which, as with sensors 114, may be used to control beam director 116 and/or be fed back to controller 104 to control the light source 102. Those of ordinary skill in the art will understand that different implementations may require different arrangements of optical elements (such as the order of components that the light passes through) without changing the fundamental nature of the system.

Figure 2:
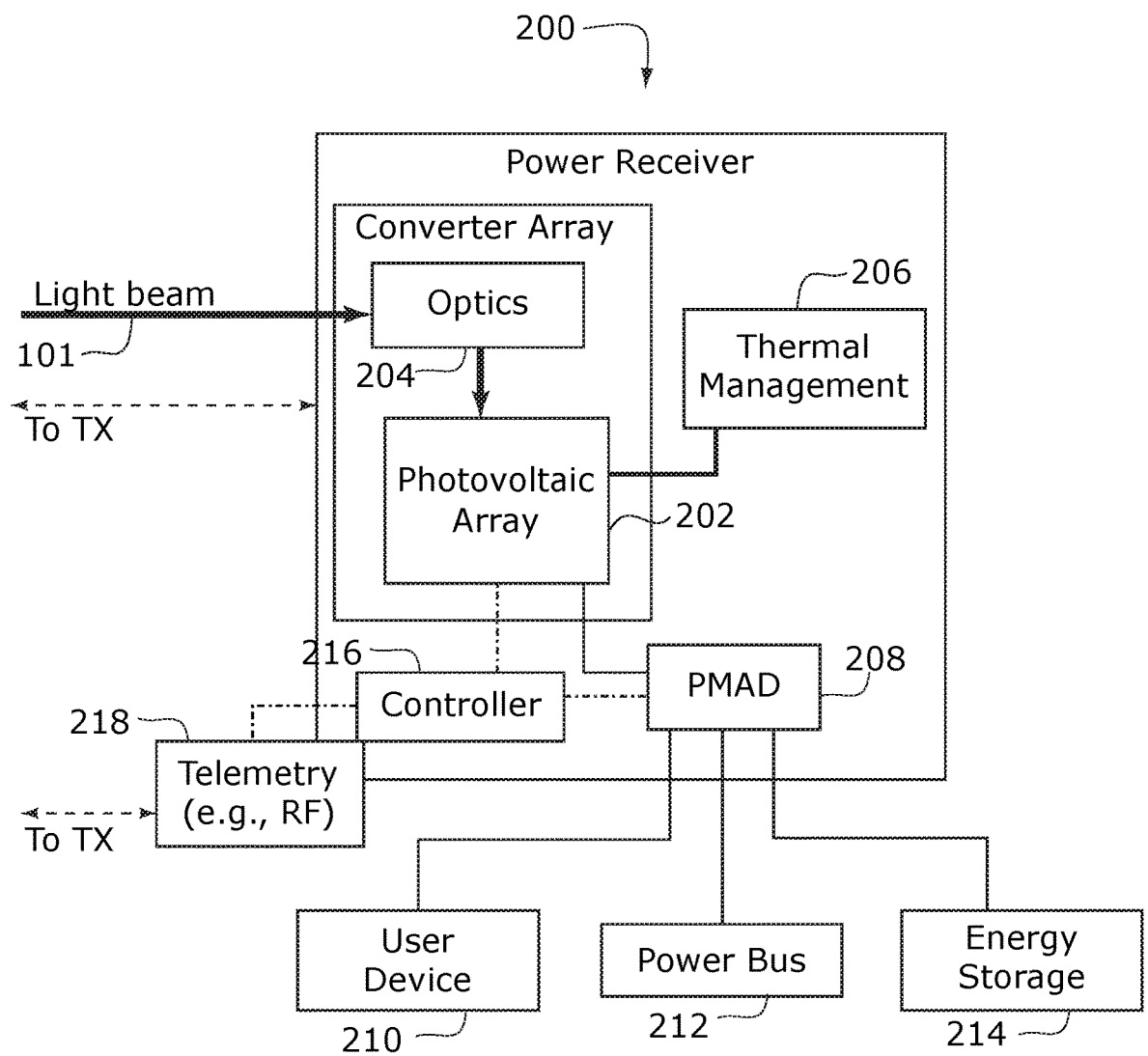
FIG. 2 is a schematic diagram of a power receiver.

FIG. 2 shows a power receiver such as a receiver that might be used with power beaming base station 100. Illustrated receiver 200 includes a photovoltaic (PV) array 202 which is configured to convert light 101 from light source 102 into electricity. In other embodiments (not shown), the receiver may include different components for converting light to electricity, such as a rectenna for converting microwave power or a heat engine for converting heat generated by the light beam to electricity. Receiver 200 may also include optics 204, which may shape or modify the received beam before it reaches PV array 202. In many implementations, PV array 202 includes a thermal management system 206. This system may include passive or active chilling, and may be configured to send a signal back to base station 100 if PV array 202 exceeds safe temperature limits. PV array 202 may further be connected to power management and distribution (PMAD) system 208. PMAD system 208 may power user devices 210, a power bus 212, and/or energy storage devices 214. It is connected to controller 216, which may monitor PV array 202 via sensors (not shown), for example monitoring voltage, current, and/or temperature of individual photovoltaic cells, groups of cells, or of the whole array, voltage and/or current of the PMAD or of individual loads. Controller 216 may also include Maximum Power Point Tracking (MPPT) for the PV array, or MPPT may be handled by PMAD system 208. PMAD system 208 may also include DC/DC converters, for example to provide power to devices 210, 212, 214 with preferred current and voltage characteristics. Telemetry unit 218 may send any or all of the above data back to the transmitter for use in controlling light beam 101, for example by a radio link or by optical communications.

Figure 3:
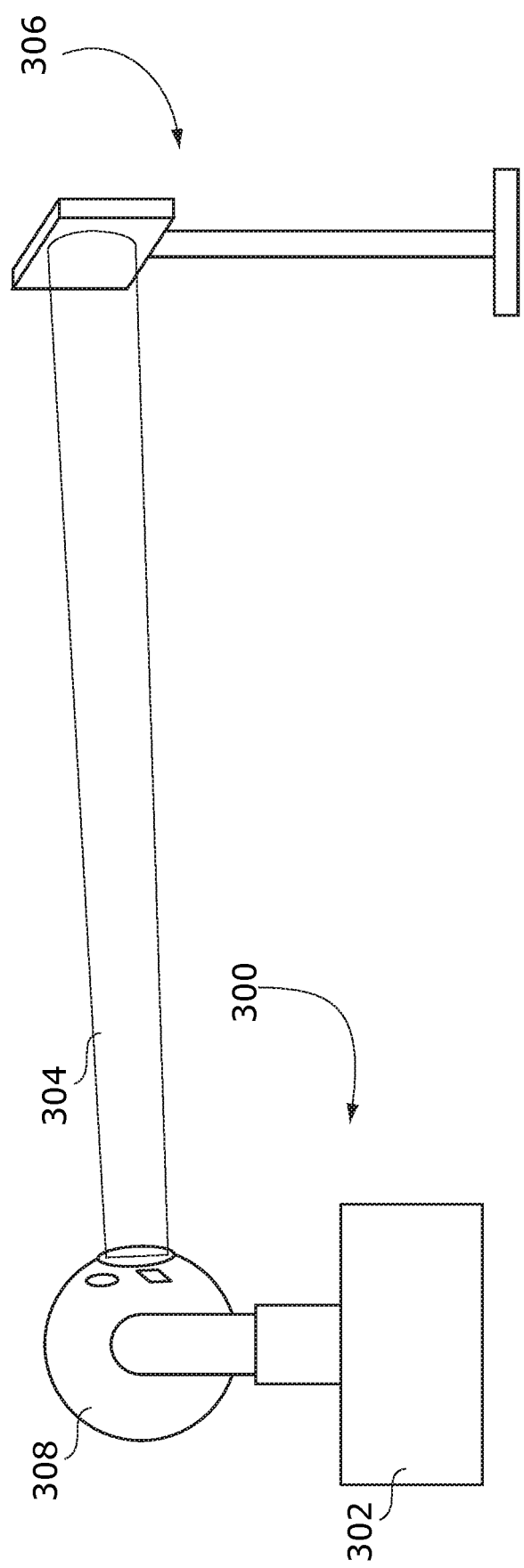
FIG. 3 and FIG. 4 are diagrams of a dual-use power beaming system in power mode and in weapon mode, respectively.

FIG. 3 shows a power-beaming system 300 in power mode. Base station 302 is shown transmitting a power beam 304, which is directed toward receiver 306 by beam director 308. The components shown schematically in FIG. 1, such as the light source, input power, and optics, are contained within base station 302, while the illustrated gimbal serves as beam director 308. In some implementations, some or all of the light source, input power, and optics may be placed in the illustrated gimbal, instead of in base station 302 (or in any other convenient area of the system to produce the desired power beam). Receiver 306 contains the components illustrated in more detail in FIG. 2. In power mode, the transmitter beams power to the receiver as discussed above in connection with FIG. 1 and FIG. 2. Laser beam and microwave power beam irradiances in power mode may be, for example, around 0.1 W/cm$^2$, around 1 W/cm$^2$, around 20 W/cm$^2$, around 50 W/cm$^2$, around 100 W/cm$^2$, or around 200 W/cm$^2$.

Figure 4:
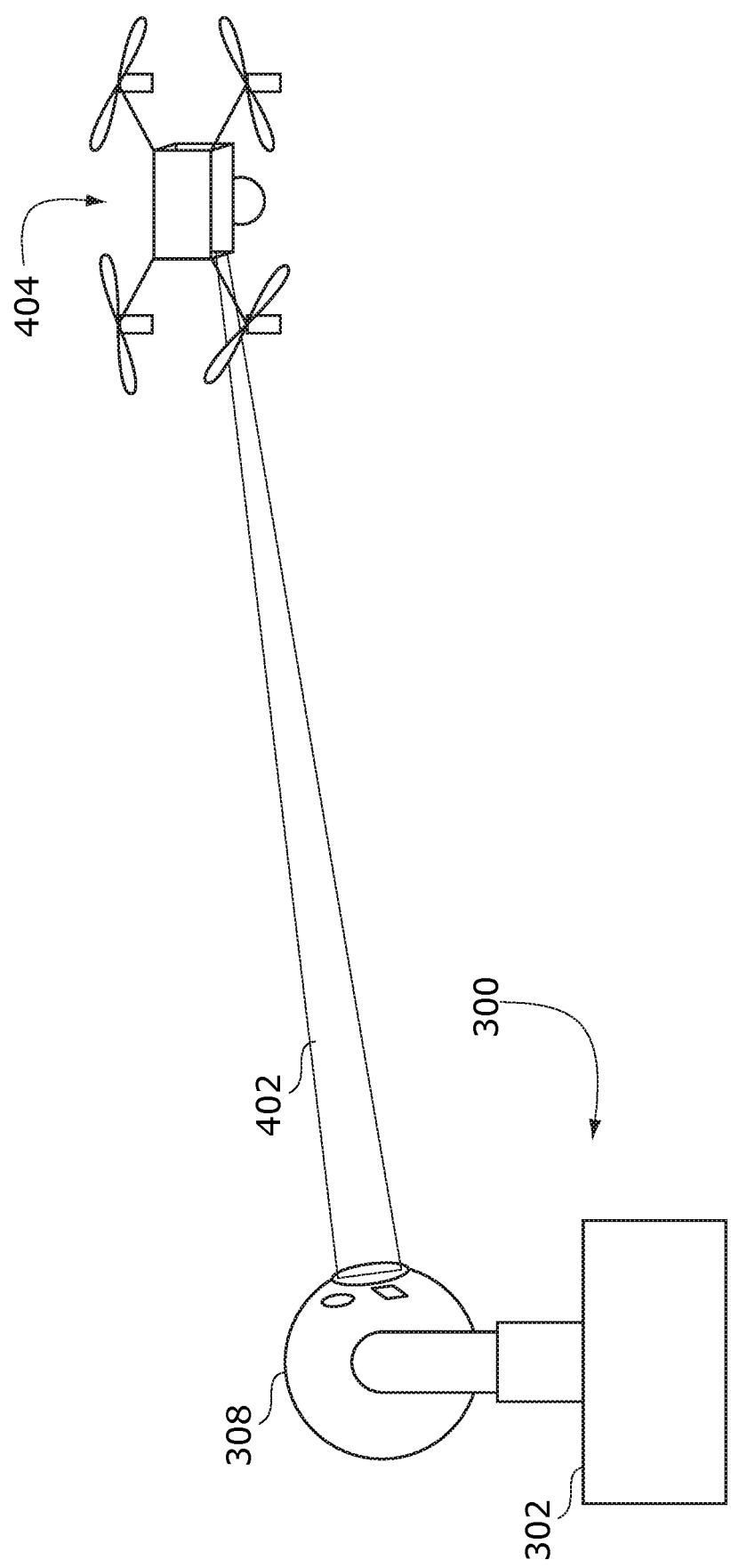

FIG. 4 shows the same system 300 as in FIG. 3, this time using weapon mode. Base station 302 again transmits a beam, but this time it is weapon beam 402. Weapon beam 402 may have substantially the same characteristics as power beam 304, or it may differ in power, intensity, wavelength, pulse character, pulse length, or other characteristics. In some implementations, the time that the system is expected to remain in weapon mode is short relative to time spent in power mode, and so the system may be more willing to tolerate larger temperature excursions and higher power draws. As illustrated, weapon beam 402 is directed toward uncooperative UAV 404 (which may be attempting to surveil the area, to attack forces friendly to the user of power beaming system 300, or to parasitize power beaming system 300), instead of toward a receiver. The same beam director 308 is used to direct weapon beam 402, but in some implementations, light may be routed through different optics within the system to achieve different levels of control and power, or the shaping optics may be adjusted, for example by changing the focus position of a lens to achieve different levels of beam irradiance at the UAV 404. In some implementations, system 300 may use adaptive optics, especially when it is used for weapons mode as shown in FIG. 4. For example, adaptive optics may use sensors to counterbalance atmospheric distortion to create a tighter beam at the UAV 404. Because it is desired to put a "hot spot" on the uncooperative vehicle, illustrated weapon beam 402 has a smaller beam width at its endpoint than the power beam 304 shown in FIG. 3. However, it will be understood that different systems may use wider or narrower beams as appropriate to the particular implementation.

System 300 may include rangefinders, cameras (e.g. using visible, near-infrared, mid-infrared, or other wavelengths), radar, or other sensors that may be used to detect and determine distance and direction to uncooperative UAV 404 or its size, albedo, geometry, or other characteristics. Beam irradiances in weapon mode may be, for example, around 50 W/cm$^2$, around 100 W/cm$^2$, around 250 W/cm$^2$, around 500 W/cm$^2$, around 1,000 W/cm$^2$, or around 5,000 W/cm$^2$. In some implementations, microwaves may be used to damage electronics, and may be able to disable UAVs or other components at intensities lower than would be necessary to completely destroy the targets.

In some implementations, thermal management system 110 may require more intense cooling when system 300 is run in weapon mode. System 300 may be provided with a superior thermal management system 110 to ensure that it can sustain use in weapon mode, or weapon mode may be limited to relatively short bursts of time in order to prevent laser overheating. In some implementations, higher temperature variations may be tolerated during short-term weapon mode operation than would be acceptable during longer-term power mode operation.

Figure 5:
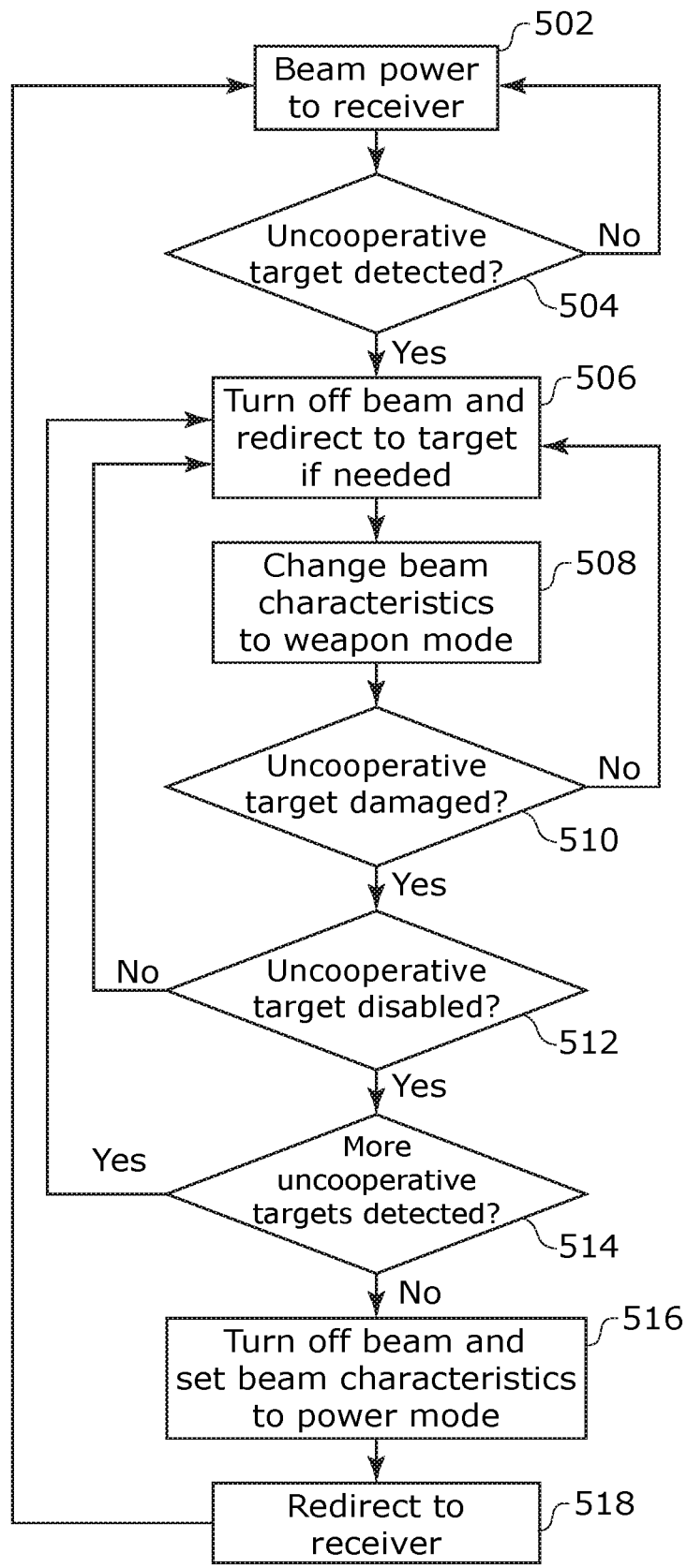
FIG. 5 is a schematic diagram showing switching within a power beaming base station between power mode and weapons mode.

FIG. 5 shows a control flow 500 for the power beaming base station 304 as shown in FIG. 3 and FIG. 4. As shown, the station begins by beaming power to a receiver (step 502). Simultaneously with beaming power to the receiver, the base station may also be monitoring for potential uncooperative targets, or it may receive communication regarding uncooperative targets from a separate threat management system. As shown in step 504, if no uncooperative target is detected, the system continues to beam power to the receiver. While beaming only to a single power receiver is shown in FIG. 5, it will be understood that this step may include beaming to a succession of receivers or managing the direction of multiple power beams to one or many receivers, including pausing power beaming if no receiver in range is in need of power.

If an uncooperative target is detected (e.g., by the transmitter or by another system such as a lidar or radar system or a tracking camera), as shown in step 504, the transmitter may reduce the beam power to zero and then redirect the beam toward the uncooperative target (step 506), before directing the beam in weapon mode at the uncooperative target (step 508). Of course, in some implementations, other determinations may also play into the decision to redirect the beam, such as a determination that the target is definitely unfriendly (for example because it has attacked a friendly component), a determination that the target is or may be vulnerable to the beam from the power station, or a determination that the receiver is not in critical need of power. The station may use other data to determine whether a target is potentially hostile, such as ADS-B data or an IFF (friend or foe) signal, or whether beaming is contraindicated for other reasons, such as Laser ClearingHouse (LCH) data provided to avoid inadvertent damage to satellites. When the beam is redirected, the transmitter may also change one or more aspects of the beam (step 508). For example, light power may be increased, a beam may change between a continuous and a pulsed character, beam width may be tightened, or beam frequency may be adjusted.

The power beaming base station may itself monitor a condition of the uncooperative target, or it may receive information from other systems or from a human operator. If it determines (or is told) that the uncooperative target is not damaged (step 510), it may return to step 506 and further adjust direction of the beam and/or further change beam characteristics (step 508). In some implementations, if the uncooperative target has been damaged, the system or an operator may go on to determine whether the uncooperative target has been disabled (step 512). If the uncooperative target is damaged but not yet disabled, the base station may return to steps 506 and 508 to continue to refine aim and beam characteristics. Once the uncooperative target is determined to have been disabled (step 512), the power beaming base station reduces the optical power to zero. It then returns beam characteristics to a set of characteristics suitable for beaming to a power receiver (step 514) and redirects the beam to the receiver (step 516). In some implementations, these steps may be simultaneous or may be performed in any order, or the steps of monitoring the uncooperative target may be omitted. The system may then return to step 502 and resume power beaming, until another uncooperative target is detected.

Not shown in FIG. 5 are safety systems that may be implemented to avoid damage to friendly forces or bystanders. For example, such systems may operate during power beaming step 502 to detect objects threatening to enter the power beam, and may disable power beaming to avoid damaging such objects or other components (for example, if a reflective object enters the beam in a fashion that may impact bystanders or equipment by redirecting the power beam, whether intentionally or accidentally). In such implementations, once the beam has been interrupted to avoid damage to an unknown object that may enter the beam, the system may also conduct a threat assessment to determine if the unknown object represents a threat and the system should shift into weapons mode and target it directly. In some implementations, when the system is directing a weapon beam at a target, safety systems may be relaxed, so that the system is more tolerant of collateral damage, while in other implementations, safety systems may continue to operate as normal in weapon mode. In implementations where safety systems are being used in weapon mode, system implementers may be cognizant of the possibility of "spoofing," and safety systems may provide for identification of objects detected by the safety system and may override beam interruption if the uncooperative target itself (or other enemy forces) are generating safety signals that would otherwise trigger interruption of the beam.

Dual-use power beaming systems as described herein may have a variety of possible users. For example, systems may be used by military or civilian operators to protect against mortars, missiles, or UAVs. Private or public facilities that need to repel intruders (e.g., prisons, ports, or energy generation facilities) might use these systems for both routine power beaming and for occasional projection of force. On a smaller scale, the present systems may also be used for other types of targets, such as in combination with a "photonic fence" insect exclusion system such as that described in U.S. Pat. No. 8,705,017. In such an implementation, a laser used primarily for beaming power might also function to disable insects that cross a beam bath, in some cases using a lower irradiance than might be typical when an expected target is a UAV or a mortar.

While the foregoing has described what are considered to the best mode and/or other examples, it is understood that various modifications may be made therein, and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended to be as broad as is consistent with the ordinary meanings of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracement of such subject matter is hereby disclaimed.

Except as stated in the previous paragraph, nothing that has been stated or illustrated is intended or should be interpreted to cause a dedication of any component, step, feature, objects, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity from another without necessarily implying any relationship or order between such entities. The terms "comprise" and "include" in all their grammatical forms are intended to cover a non-exclusive inclusion, so that a process, method, article, apparatus, or composition of matter that comprises or includes a list of elements may also include other elements not expressly listed. An element preceded by "a" or "an" does not, without further constraints, preclude the existence of additional identical or similar elements.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features may be grouped together in various examples for the purpose of clarity of explanation. This method of disclosure is not to be interpreted as reflecting an intention that the claims require more features than are expressly recited in each claim. Furthermore, features from one example may be freely included in another, or substituted for one another, without departing from the overall scope and spirit of the instant application.

What is claimed is:

1. A system for directing power, comprising:
   a light source configured to emit a beam of electromagnetic energy;
   shaping optics configured to shape the beam into a selected beam profile;
   a beam director configured to direct the beam in a selected direction; and
   a switch configured to switch the system between a power mode and a weapon mode, wherein:
   in the power mode, the beam director is configured to direct the beam toward a receiver and the shaping optics are configured to shape the beam profile into a power profile selected to match a size and shape of the receiver; and
   in the weapon mode, the beam director is configured to direct the beam toward a target and the shaping optics are configured to shape the beam profile into a weapon profile selected to inflict damage on the target.

2. The system of claim 1, further comprising a receiver configured to receive the directed beam and convert it into power.

3. The system of claim 1, wherein the light source is a laser.

4. The system of claim 1, wherein the light source is a microwave or millimeter wave source.

5. The system of claim 1, wherein the weapon mode includes a more concentrated irradiance than the power mode.

6. The system of claim 1, wherein in the weapon mode, the switch is further configured to change the beam of electromagnetic energy emitted from the light source by modifying at least one property selected from the group consisting of power, intensity, wavelength, pulse character, pulse length, focus, and intensity profile.

7. The system of claim 6, wherein the light source is configured to deliver more electromagnetic power when the switch is set to weapon mode than when the switch is set to power mode.

8. The system of claim 6, wherein the light source has a different wavelength in power mode from in weapons mode.

9. The system of claim 6, wherein the light source includes a plurality of light sources, and wherein the beam of electromagnetic energy is produced using different subsets of the plurality of light sources in power mode and in weapon mode.

10. The system of claim 6, wherein the switch is configured to switch the system to weapons mode in response to an operator selection.

11. The system of claim 6, wherein the switch is configured to switch the system to weapons mode without operator intervention.

12. A method of beaming power to a receiver and damaging an uncooperative target, comprising:
    transmitting a beam of light from a transmitter toward the receiver for conversion to electrical energy;
    in response to detection of an uncooperative target, changing at least one characteristic of the beam of light from an original characteristic to a changed characteristic, the changed characteristic selected from the group consisting of power, intensity, wavelength, pulse character, pulse length, focus, and intensity profile;
    directing the beam of light having the changed characteristic toward the uncooperative target; and
    damaging the uncooperative target with the beam of light having the changed characteristic.

13. The method of claim 12, further comprising receiving the beam of light at the receiver and converting the beam of light into electricity at the receiver.

14. The method of claim 13, wherein converting the beam of light into electricity at the receiver includes converting the light with a component selected from the group consisting of a photovoltaic cell, a rectenna, and a heat engine.

15. The method of claim 12, wherein directing the beam of light having the changed characteristic toward the uncooperative target includes switching off the light while redirecting a beam director toward the uncooperative target.

16. The method of claim 12, wherein detection of an uncooperative target includes selection of the uncooperative target by a human operator.

17. The method of claim 12, wherein detection of an uncooperative target includes automated detection of the uncooperative target.

18. The method of claim 12, further comprising resuming directing light having the original characteristic to the receiver in response to a determination that the target has been damaged by the changed beam of light.

19. The method of claim 12, further comprising resuming directing light having the original characteristic to the power receiver in response to a determination that the target has been disabled by the changed beam of light.

20. The method of claim 12, further comprising resuming directing light having the original characteristic to the receiver in response to a determination that the receiver is in need of power.

* * * * *